Figure 1:
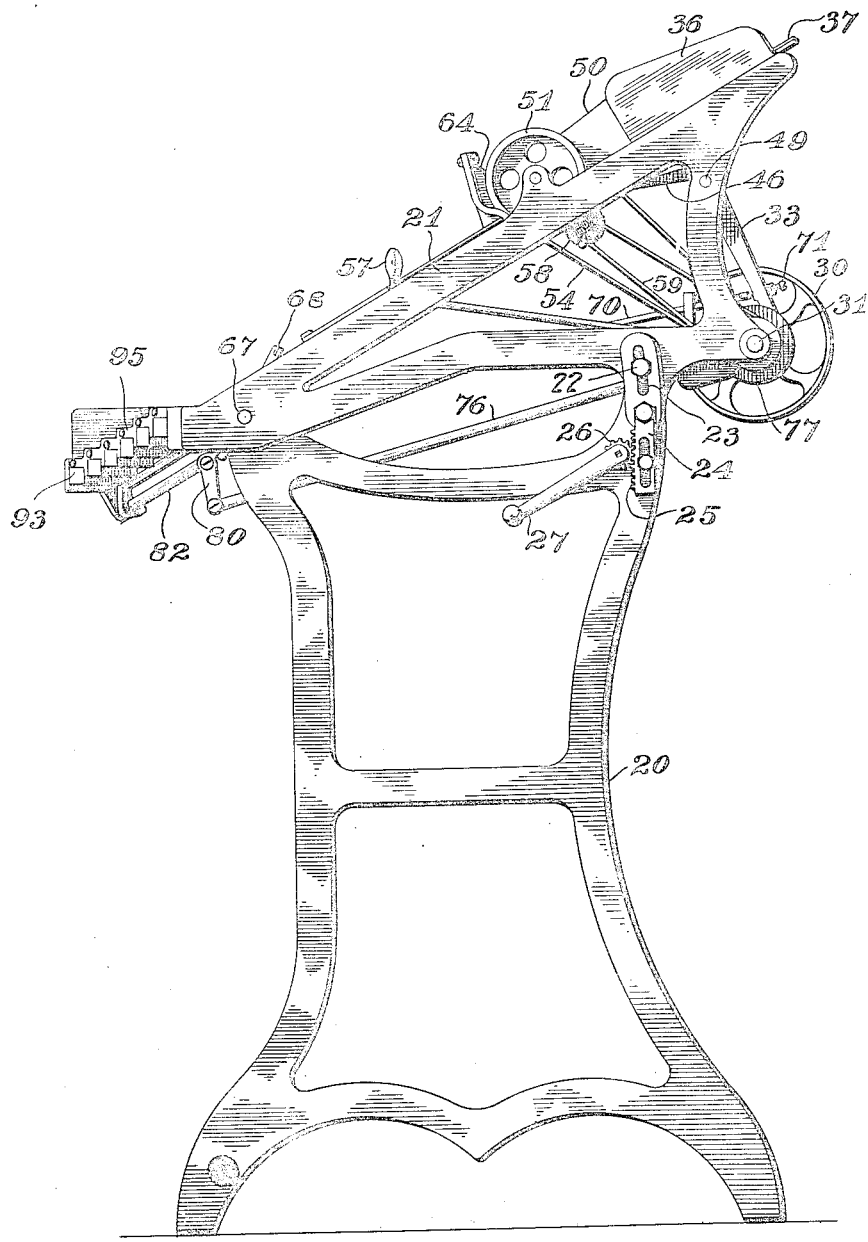

W. L. CURTIS.
HOOK FEEDING MECHANISM.
APPLICATION FILED NOV. 24, 1908.

1,042,407.

Patented Oct. 29, 1912.
8 SHEETS—SHEET 1.

Witnesses:
Leon H. Horner.
C. I. Hartnett.

Inventor:
Walter L. Curtis
By Southgate & Southgate
Attorneys

W. L. CURTIS.
HOOK FEEDING MECHANISM.
APPLICATION FILED NOV. 24, 1908.

1,042,407.

Patented Oct. 29, 1912.
8 SHEETS—SHEET 5.

Witnesses:
Leon H. Horner
C. I. Hartnett

Inventor:
Walter L. Curtis
By Southgate & Southgate
Attorneys

W. L. CURTIS.
HOOK FEEDING MECHANISM.
APPLICATION FILED NOV. 24, 1908.
1,042,407.
Patented Oct. 29, 1912.
8 SHEETS—SHEET 6.
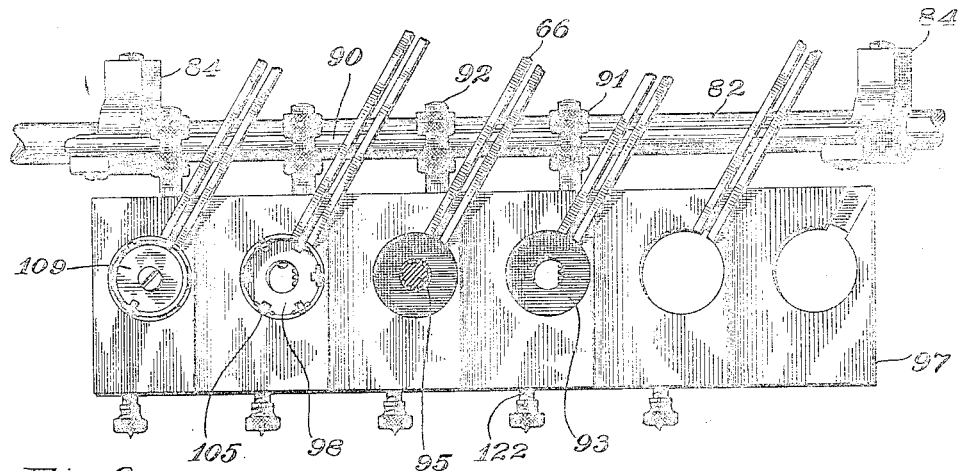
Fig. 6.
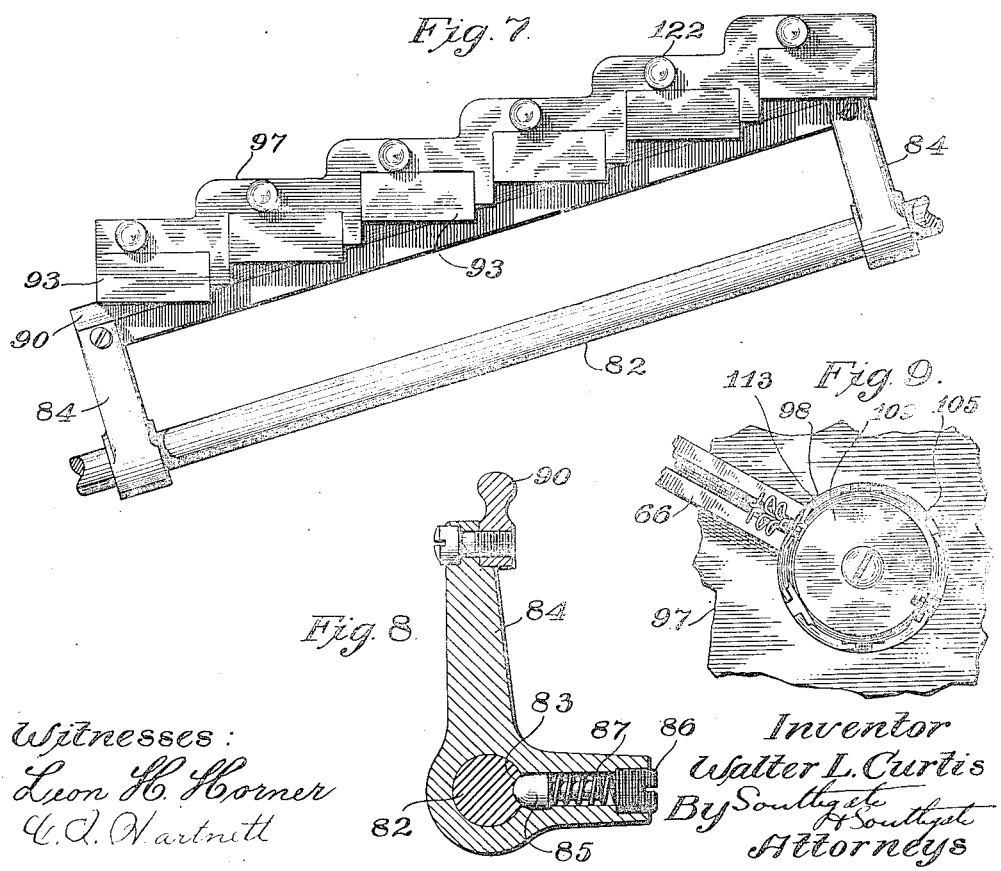
Fig. 7.
Fig. 8.
Fig. 9.
Witnesses:
Leon H. Horner
C. A. Hartnett
Inventor
Walter L. Curtis
By Southgate & Southgate
Attorneys

W. L. CURTIS.
HOOK FEEDING MECHANISM.
APPLICATION FILED NOV. 24, 1908.

1,042,407.

Patented Oct. 29, 1912.
8 SHEETS—SHEET 7.

Witnesses:
Leon H. Horner
C. I. Hartnett

Inventor:
Walter L. Curtis
By Southgate & Southgate
Attorneys

W. L. CURTIS.
HOOK FEEDING MECHANISM.
APPLICATION FILED NOV. 24, 1908.
1,042,407.
Patented Oct. 29, 1912.
8 SHEETS—SHEET 8.
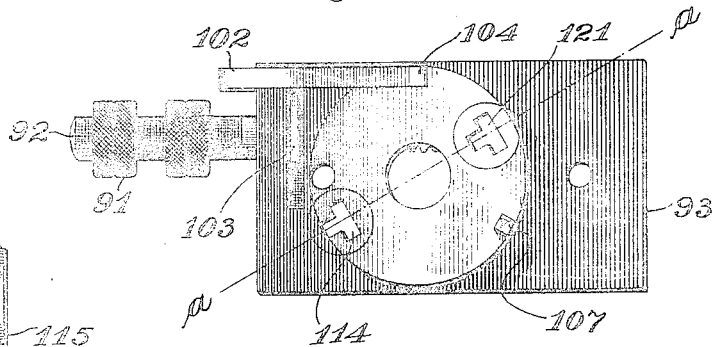
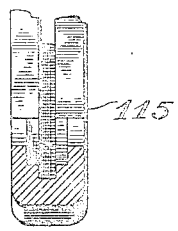
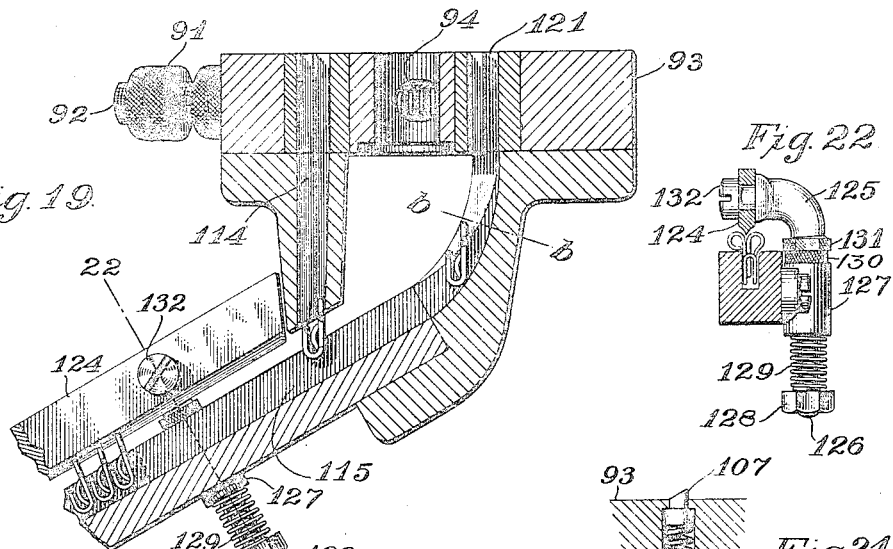
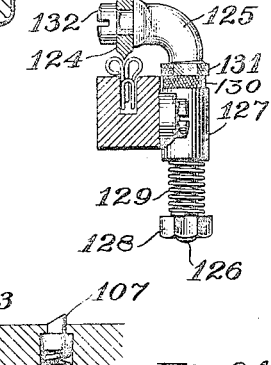
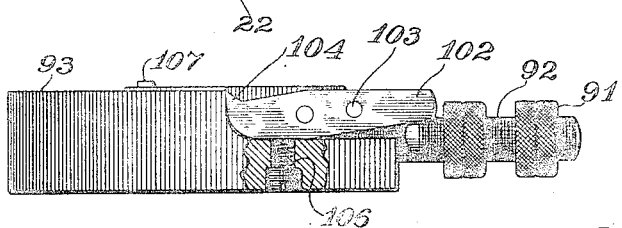
Witnesses:
Leon H. Horner
C. S. Hartnett
Inventor:
Walter L. Curtis
By Southgate & Southgate
Attorneys

UNITED STATES PATENT OFFICE.

WALTER L. CURTIS, OF WORCESTER, MASSACHUSETTS, ASSIGNOR TO DE LONG HOOK AND EYE COMPANY, OF PHILADELPHIA, PENNSYLVANIA, A CORPORATION OF PENNSYLVANIA.

HOOK-FEEDING MECHANISM.

1,042,407. Specification of Letters Patent. Patented Oct. 29, 1912.

Application filed November 24, 1908. Serial No. 464,228.

*To all whom it may concern:*

Be it known that I, WALTER L. CURTIS, a citizen of the United States, residing at Worcester, in the county of Worcester and State of Massachusetts, have invented a new and useful Hook-Feeding Mechanism, of which the following is a specification.

This invention relates to a machine for feeding hooks and similar articles from a confused mass in a hopper to a guide or series of guides, and during the feeding operation arranging them so that they will all be located in the same relative position.

The principal objects of the invention are to provide means whereby this orderly arrangement of the hooks or the like may be brought about in a very simple, convenient, and accurate manner without employing any large amount of power and without necessitating too much manipulation on the part of the operator; to provide such an arrangement that in case the hooks get clogged in the machine, no injury will be done either to the hooks or to the mechanism, and that the hooks may be discharged easily from the machine leaving it in proper condition to continue in operation.

The invention also involves efficient means for positively feeding the articles toward a rotating wheel, or other positive feed device, which picks them out of the hopper in which they are first placed, and discharges them into a series of chutes which feed them forward, and also assist in arranging them in proper position; for vibrating or agitating the hoppers; for throwing sections of the vibrating wheel out of operation independently of the others, so that if any parts of the apparatus get clogged it need not interfere with the proper operation of the rest; for vibrating the guides after the hooks are arranged in them; for periodically stopping the hooks on the guides; for throwing the last named means out of operation; for receiving the hooks arranged longitudinally in parallelism, and having some hooks pointing one way and some the other, and reversing the hooks pointing one way in a most simple and effective manner, for keeping the hooks from falling out of the guide; for easily adjusting the angle of the whole apparatus so as to regulate the speed of operation thereof, and modify the effects of the various parts in which the hooks are fed by gravity; and in general to improve and simplify the mechanism for accomplishing these and the other results of this invention.

Reference is to be had to the accompanying drawings in which—

Figure 2:
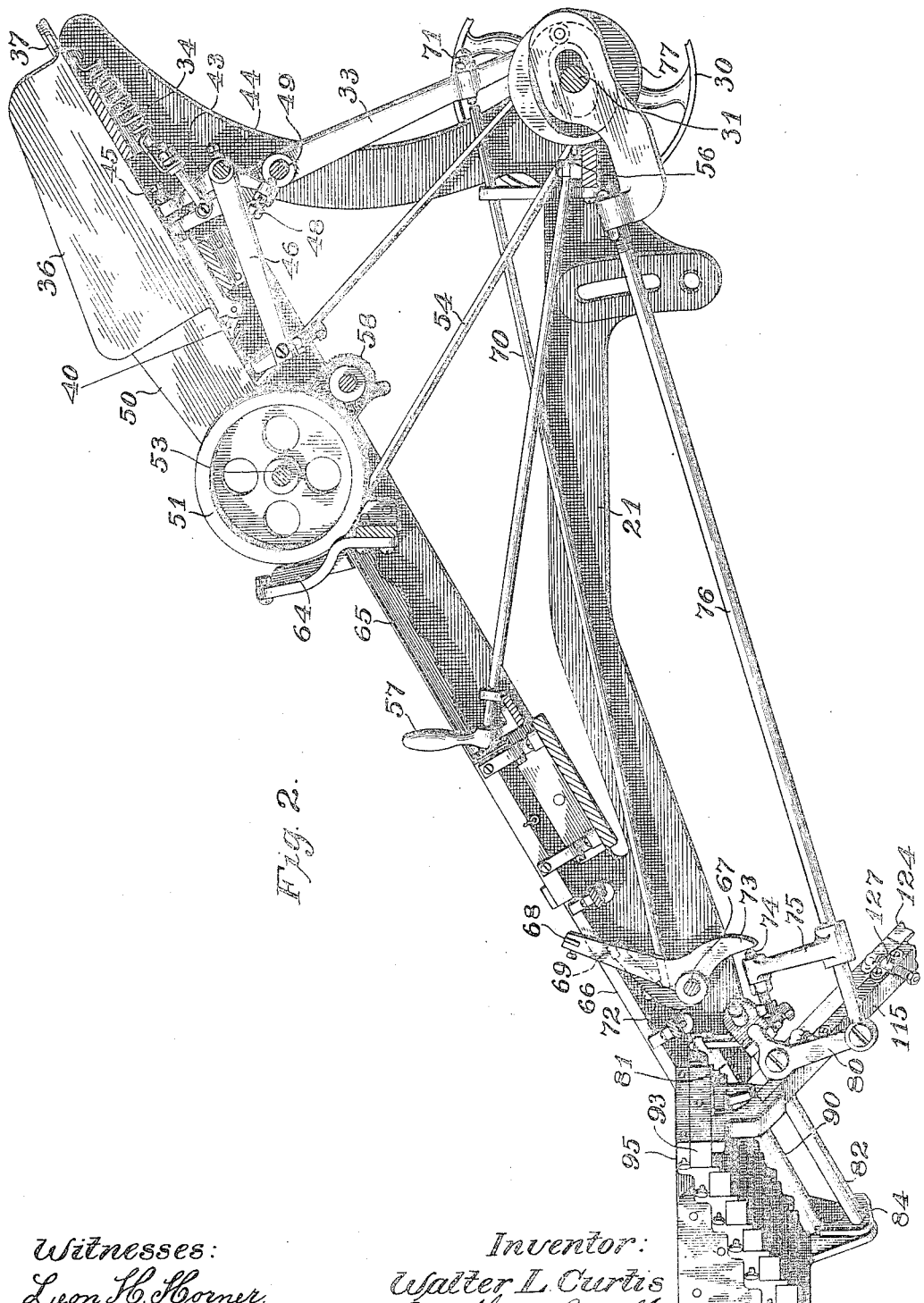
Figure 3:
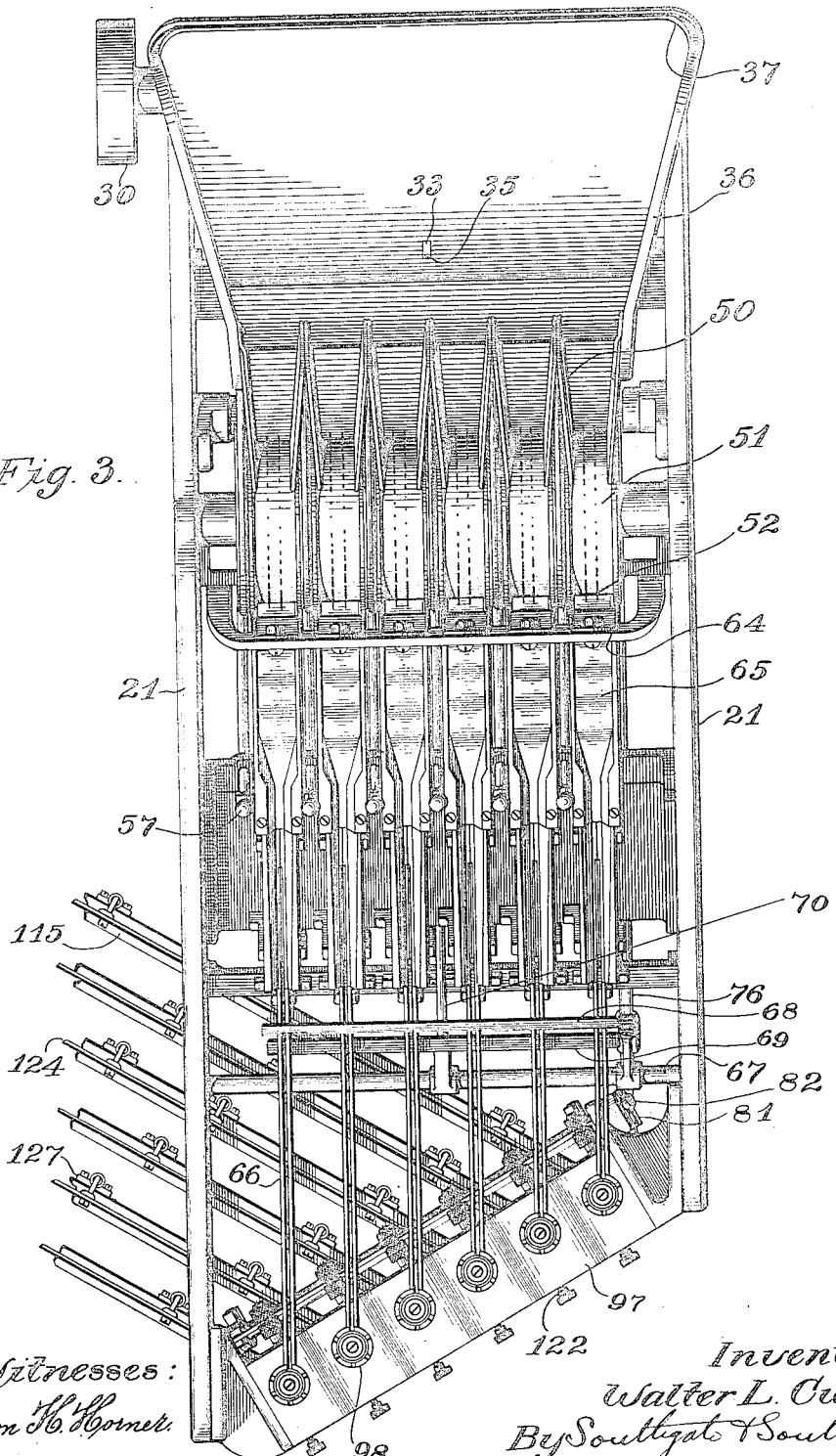
Figure 4:
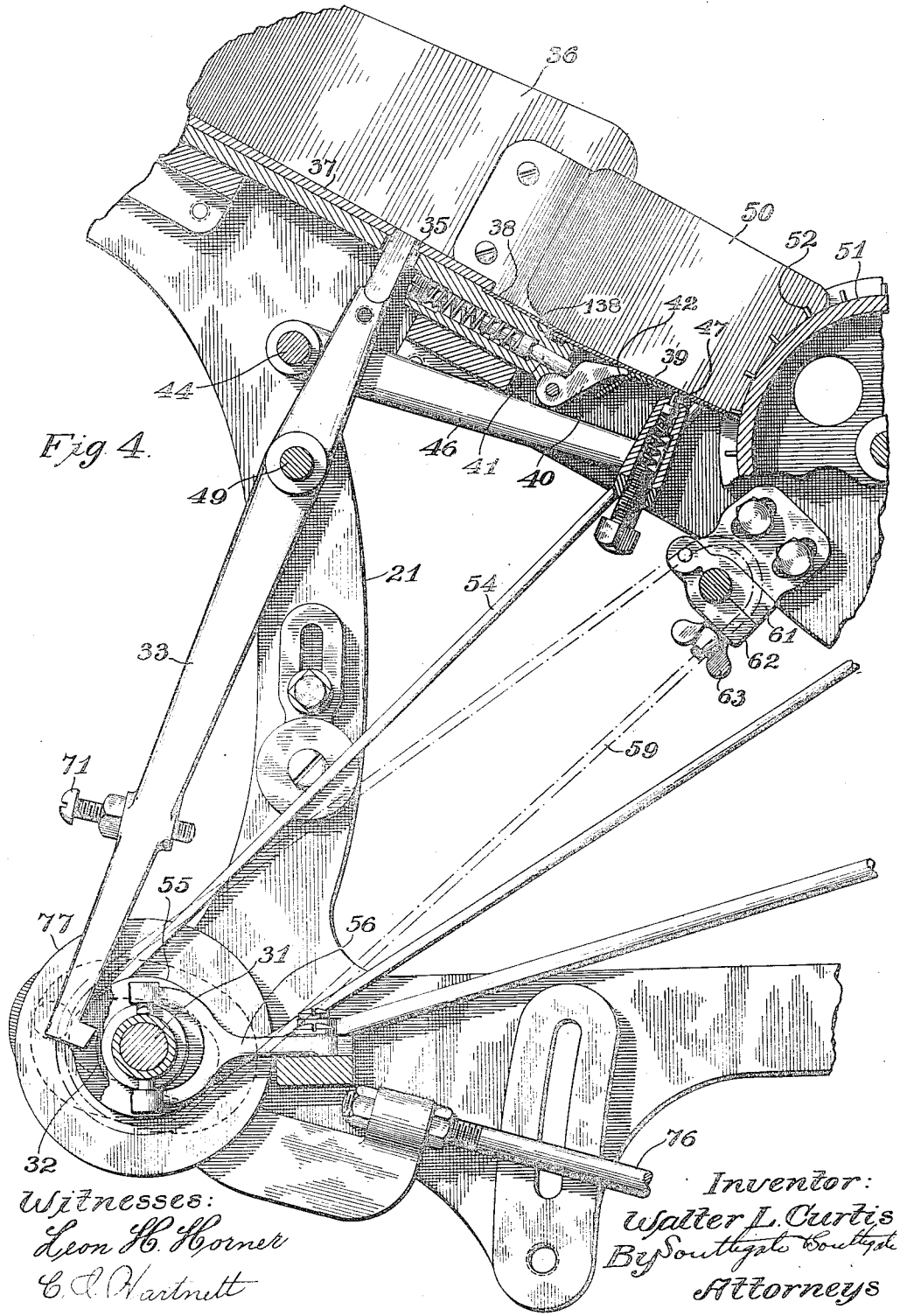
Figure 5:
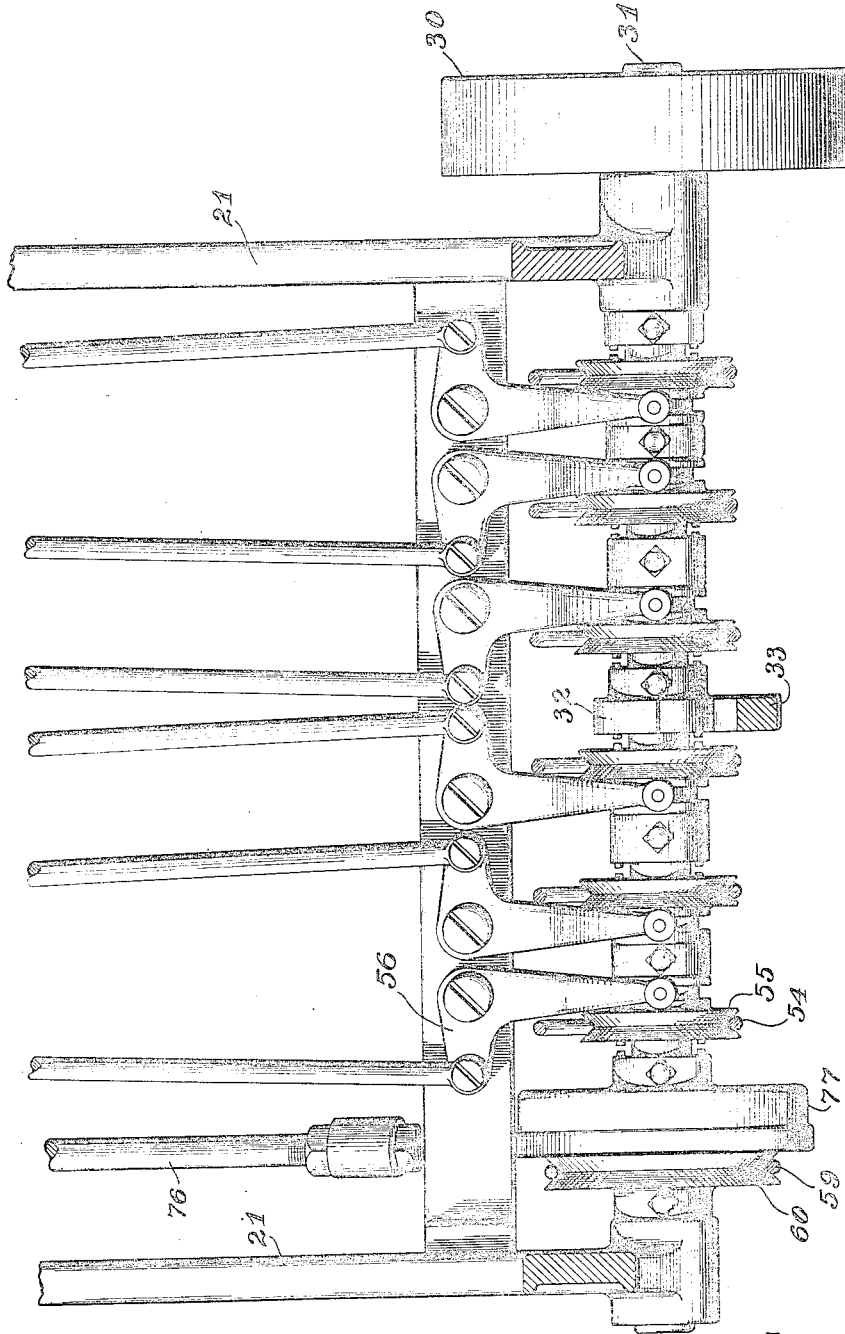
Figure 10:
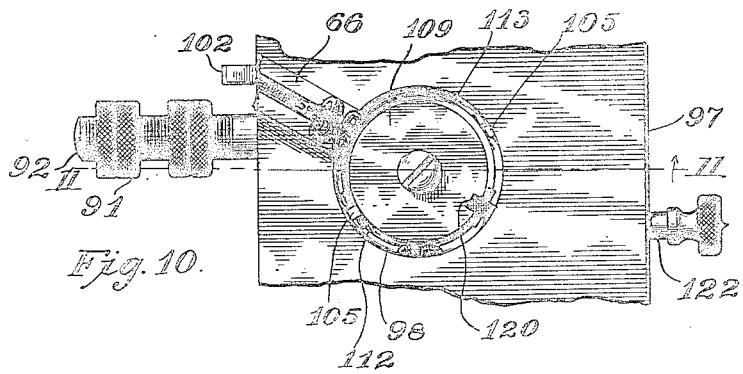
Figure 11:
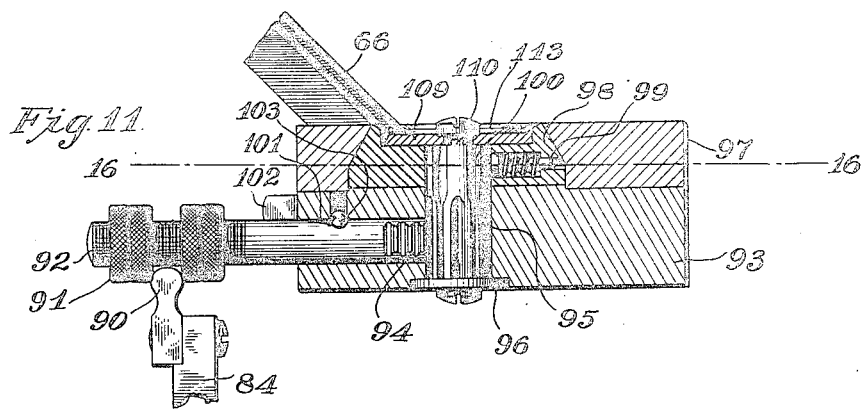
Figures 12, 14, 15:
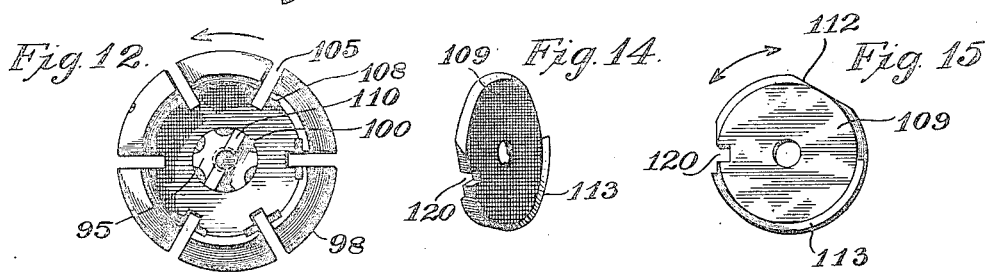
Figures 13, 16:
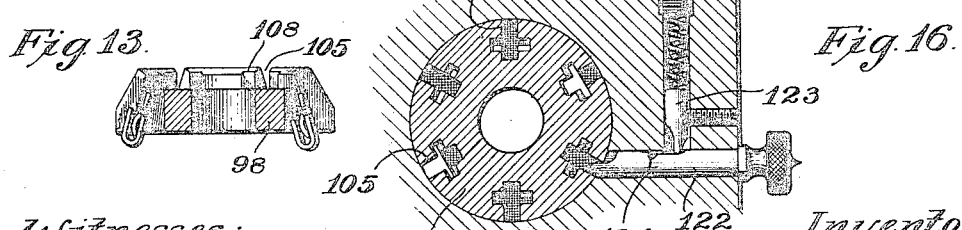

Figure 1 is a side elevation of a machine constructed in accordance with this invention; Fig. 2 is a similar view with parts in section on an enlarged scale; Fig. 3 is a plan of the same; Fig. 4 is a central sectional view on an enlarged scale of the upper part of the mechanism shown in Fig. 1; Fig. 5 is a plan of the power shaft for operating the same; Fig. 6 is a plan of the hook reversing mechanism showing several units thereof, each one appearing with certain parts removed so as to show the entire construction thereof; Fig. 7 is an end view of the same; Fig. 8 is a sectional view of a lever constituting a part thereof; Fig. 9 is a diagrammatic plan of one of the units of this mechanism showing the parts in position for feeding a hook which enters with the bill forward; Fig. 10 is a plan of the mechanism showing the position of the parts when the hook enters in the opposite way; Fig. 11 is a sectional view of the same on the line 11—11 of Fig. 10; Fig. 12 is a plan of one of the elements thereof; Fig. 13 is a central sectional view of the same; Fig. 14 is a perspective view of another of the elements thereof; Fig. 15 is a plan of the same; Fig. 16 is a sectional view on the line 16—16 of Fig. 11 with certain parts removed; Fig. 17 is a plan of the device with the top plate and connected mechanism removed; Fig. 18 is a transverse sectional view on the line $b$—$b$ of Fig. 19 and showing certain guiding devices below the same; Fig. 19 is a sectional view of the same on the line $a$—$a$ in Fig. 17; Fig. 20 is a rear elevation of the parts shown in Fig. 17; Fig. 21 is a fragmentary sectional view of the spring lock shown in Fig. 20, and Fig. 22 is a sectional view on the line 22—22 of Fig. 19.

The invention is shown in a form in which a supporting frame 20 is employed for carrying the entire feeding and arranging device. The latter is mounted upon a frame 21 which is pivoted to the frame 20 on a pair of studs 22. At the rear the frame 21 is provided with a long slot 23, and with a slotted projection 24 having a rack 25 thereon, and the supporting frame 20 is provided with a stud having a gear or segment 26 and an operating handle 27. The gear meshes with the rack and when it is desired to change the angle of the operating parts of the frame 21 so as to effect the rapidity of operation or otherwise influence the manner in which the articles are fed, the bolts or screws with which the frame 21 is secured through the slots to the frame 20 are loosened and the handle 27 is turned. This adjusts the angle of the frame 21 and the bolts or screws may then be tightened up so as to hold the frame at the proper angle.

The power to operate the machine is supplied through a pulley 30 mounted on the main shaft 31 which is supported in bearings on the frame 21. This shaft is provided with a cam 32 which at each operation oscillates a lever 33 in opposition to an adjustable spring 34. This lever extends through an opening 35 in the bottom of the receiving hopper or chute 36 and enters a reciprocably mounted plate 37 thereon. The bottom of this hopper and the plate 37 are on an inclination which, as has been described, can be regulated in a very simple manner to give the proper amount of feed. The positive reciprocation of this plate by means of the lever 33 causes its lower square end to engage any hooks which may be below it and to positively feed them downward so that there is no danger of the hooks not feeding forward in the hopper. It will be understood, of course that the mere reciprocation of this plate is sufficient under ordinary circumstances, and when the inclination is above a certain angle, to cause the hooks to be discharged along it and from it on a lower plate 38. In addition to these means for insuring a proper feed of the hooks, a plate 39 is movably mounted below the plate 38 to receive the hooks therefrom. Below it is a lever 40 pressed forward by an adjustable spring 41 against a plate 42 to yieldingly hold the front end of the plate 39 against the feed roll. On the rear end of the plate 39 is an enlargement held loosely in a recess 138 under the plate 38, so as to permit the plate 39 to move backwardly when a hook is carried around the feed roll. This plate 39 is intended to be vibrated at regular intervals for the purpose of jarring the hooks down into position to be taken up and fed forward. This is shown as being accomplished in the present instance by means of a bell-crank 43 mounted on a rockshaft 44 and having an adjustable screw 45 engaging the lever 33 so that at each oscillation of the latter lever the bell-crank will also be swung on its shaft. The bell-crank is provided with an arm 46 extending forward and having thereon an adjustable spring-pressed yielding pin 47 adapted to engage the bottom of the plate 39 and tap it every time the bell-crank swings. The bell-crank moves in the opposite direction by gravity alone, and its downward motion is regulated and limited by an adjustable screw 48 on the frame which is shown in the present instance as engaging the shaft or stud 49 on which the lever 33 is pivoted. It will be seen that all these parts are readily adjustable so that the proper amount of vibration and motion can be given to the parts to feed the hooks forward with just the sufficient degree of rapidity.

The plate 39 is provided with a series of diverging guards 50 which divide the hooks into a series of paths and direct them to a plurality of rotating wheels or cylinders 51, each having one or more rows of pins 52 thereon for engaging the hooks and drawing them up out of the hopper and feeding them forward. All these wheels or cylinders are mounted loosely on a shaft or stud 53, and they rotate independently. Each of them is driven by a belt 54 extending up between the diverging guards 50 and engaging a pulley 55 loosely mounted on the driving shaft 31. These pulleys 55 are intended to be shifted back and forth to clutch them to the driving shaft by means of bell-cranks 56 and operating handles 57 connected therewith and extending upwardly in front of the device, so as to be readily reached by the operator.

Mounted underneath the series of wheels or cylinders 51 is shown a rotary brush 58 which is operated by a belt 59 connected with a pulley 60 fixed to the shaft 31. This brush operates continuously and brushes away any hooks which may go clear around without being discharged from the cylinders. A receptacle may be placed in convenient position for engaging hooks brushed away in this manner. The brush is shown mounted in bearings each formed by an adjustable bracket 61 and a pivoted plate 62 movably held by a thumb screw 63 or the like.

On the front of the several wheels or cylinders 51 they are provided with guides 64 which are fixed to the frame and which prevent the hooks from being thrown off the cylinders. As the pins on the cylinders reach an inclined position during their rotation the hooks are discharged by gravity and thrown into a series of chutes 65, which, in themselves serve to arrange the hooks in a general longitudinal direction and in parallelism with each other, in accordance with my previous application for patent on a machine for assembling hooks and eyes and attaching them to cards, filed March 16, 1908, Serial No. 421,347. As these chutes are fully described and claimed in said application they will not be described in detail here. It will be understood, however, that the present invention is not limited to the use of these particular chutes, but that any other means which may be found efficient for taking the hooks from the cylinders and bringing them into position with their bills extending down and supporting them by their shoulders may be substituted for it. In the present case the chutes deliver the hooks in this manner with their shoulders resting on inclined guide rods 66 down which they slide.

In order to provide for regulating the feed of the hooks and at the same time tapping the inclined guide rods slightly, a rock shaft 67 is mounted on the machine and provided with two cross bars 68 and 69, one above the guides 66 and the other below to engage the top and bottom thereof. As the machine operates a number of hooks will be held first by the upper cross bar and then will be released, and the feed of the same will be regulated. At the same time a slight agitation is given to the guides by the lower cross bar so as to insure the proper feeding of the hooks by gravity. The upward motion of the bar 69 is caused by the movement of a sliding rod 70 which is operated by the lever 33 through an adjustable screw 71 thereon. This rod engages the frame 72 on which the bar 69 is mounted, and which is pivotally mounted on the rock shaft 67. The rock shaft itself is operated through a projection 73 thereon which is engaged by an adjustable screw 74 on a bracket 75 fixed to a sliding rod 76 which is operated by a cam 77 on the driving shaft 31. When it is desired to throw the bar 68 out of operation, it is swung forward turning the shaft 67 on which it is fixed and carrying the projection 73 thereon, out of reach of the screw 74. This rod 76 also has another function as by means of a bell-crank 80 which is pivoted thereto, it serves to oscillate a block 81 and a shaft 82 to which the block is fixed. The shaft 82 is provided with grooves 83, and on it are mounted a pair of brackets 84 which are normally held in fixed position with respect to the shaft by means of plungers 85 which enter the grooves 83. The plungers are adjustable by screws 86 and held resiliently by springs 87. The ends of the plungers are rounded so as to partake of the shape of the groove to permit the bracket 84 to slip on the shaft in case it is subjected to excessive strain. This prevents injury to the mechanism, and also to the hooks which are fed. On the brackets 84 is removably mounted a bar 90 which has a bead thereon adapted to engage between two sets of adjustable nuts 91 on a series of reciprocating slides 92. These slides are mounted to operate in a block 93 and it will be obvious that the ordinary operation of the mechanism so far described will result in sliding them back and forth, and that their motion will be regulated by the nuts 91. Each of the slides is provided with a rack 94 engaging a toothed drum 95 which is mounted to turn in a recess in the plate 93. This drum is provided with teeth for engaging the rack and is also provided with a bearing plate 96 secured to the end of the drum by a screw or the like, and set into the recess above the bottom of the plate. The drum also extends above the top of the block 93 into a frame 97, and has journaled upon it a rotatable disk 98. This disk is provided with a round headed spring-pressed plunger 99, and the drum is provided with a series of depressions 100 of rounded shape for receiving the head of the plunger. It is desired to operate the disk 98 not in an oscillating manner, but to give it a step by step rotary motion. For this purpose the slide 92 is provided with a recess 101 which slants in one direction, and on the block 93 is pivoted a lever 102 having a pin 103 thereon located in a recess in the block and adapted to extend into the recess 101. The lever has a tooth 104 on its inner end for engaging the lower edge of the radial openings 105 in the disk 98. Now it will be obvious that when the slide is pushed in, the pin 103 will be pushed up and the tooth of the lever withdrawn into the block 93 and out of contact with the disk so as to permit the disk to be rotated freely by the drum. But when the slide is withdrawn as indicated in Fig. 11, the inner end of the lever will be pushed up by an adjustable spring 106. This causes the tooth 104 to engage in one of the slots 105 and prevents the disk from being rotated forwardly when the slide is pulled nearly out. An adjustable spring pressed pawl 107 acts in a similar way to prevent backward rotation at all times. Consequently the disk 98 will be given an intermediate rotary motion, always in the same direction, but in case of any clogging of the parts the plunger will yield so that neither the mechanism nor the hooks will be injured.

The upper inclined edge of the disk 98 is located in position to receive hooks conducted down the guides 66, and it will be remembered that the hooks are delivered to said guides in such a way that they all descend along them supported by their shoulders, and with their bills hanging down. The bills, however, are not all arranged in the same way, as some of them project forwardly and some of them rearwardly. The radial openings 105 extend entirely through the disk 98 and are adapted to receive the bills when they are presented to the disk by the guides. This disk also is provided with a series of passages 108 transverse to the radial openings and adapted to receive the shoulders or eye-ends of the hooks. Consequently when the hooks are properly presented to these passages they would all drop clear through the same, no matter in which way the bills pointed, if it were not for a disk 109. This disk 109 is caused to move positively with the drum by means of a diametrical projection 110 on the drum which fits a corresponding groove on the underside of the disk. It is provided with a raised slanting edge 113 which is a sufficient distance from the openings in the disk 98 to permit all the hooks to pass through the latter which are presented with the bills at the rear. Consequently when a hook is presented in that position it is held in the guides until the two disks rotate on their forward motion far enough to bring one of the radial passages and a cut away part 112 of the disk 109 into registration with the hooks, and then it is carried around until this radial passage registers with a passage 114 when it immediately drops down through the same into a guideway 115 with the bill forward therein. The word "forward" is used here because the guide 115 extends rearwardly, but it will be understood that the bill of the hook has not changed position. On the other hand if a hook comes down the guides in the other direction with the bill forward, the edge 113 of the disk 109 will engage the top of the hook and prevent the hook from going far enough toward the center of the disk to allow the shoulders to fall down through the passage 108, but the hook will be retained on the top of the disk 98 and will be carried around therewith on each oscillation of the drum. After the hook comes to the position in which the bill thereof can register with a passage 120 in the disk 109, which occurs when it reaches substantially the opposite side thereof, the parts will be in such position that the hook can drop down into one of the passages 105, 108 and be carried forward until it reaches a passage 121 in the block 93, where it falls down through into the top of the guide 115 which is directly opposite the guide 114. It will be noticed now that although the hook has been turned around 180 degrees by the rotation of the disk 98, it enters the guide 115 in the same position as the hook coming into it from the guide 114. Consequently by this simple arrangement all the hooks will be advanced down the guide 115 in the same position, so that they can be taken therefrom by an automatic machine and all manipulated exactly in the same way. It will be observed that a plurality of these hook reversing devices are shown in the drawings. Each of them is operated from the same rock shaft 82, but each of them may be disconnected therefrom independently so that any one or more of them can be thrown out of operation without affecting the rest of the machine. This is done by the mechanism shown in Fig 16, in which a sliding pin 122 is shown having a pointed end adapted to enter one of the radial passages 108. In that figure the pin is shown as thrown in and the disk as prevented from rotating. Of course in this case the corresponding disk 109 continues to oscillate, but as the disk 98 is stationary the hooks cannot be fed forward. The pin 122 is normally held in inactive position by an adjustable spring-pressed plunger 123 which engages a notch 124 therein to hold it out.

It will be observed that on account of the shape of the top of the disk 109 and its relation to the disk 98, there is a small cup-shaped opening in the top of the frame 97 which is recessed to receive these disks, and that it has comparatively smooth walls, so that the operator can brush surplus hooks out of the way if they accumulate on the top of the disk.

In order to keep the hooks on the guide and prevent their being dislodged, a guard plate 124 having a V-shaped lower edge is mounted on supports 125 so as to project down between the shoulders of the hooks while in the guide 115. The supports 125 are carried by rods 126 each reciprocably supported by a bracket 127 and having at their lower ends adjusting nuts 128. Springs 129 are mounted above the nuts so as to bear on the bracket and hold the guard plate down yieldingly, but so as to permit of forcing it up at either end, or both to release any hooks that may get clogged up under it. The tension of the spring is adjusted by the nuts. The support 125 is shown as having a shoulder 130 bearing on a nut 131 resting on the top of the bracket and adjustable to permit adjustment of the guard plate up and down. The bracket is secured to and supported by the guide 115. The guard plate is movably held on the supports 125 by screws 132 or the like.

While I have illustrated and described a preferred form of the invention, I am aware that many modifications may be made therein, that the invention may be used with other forms of hook feeding chutes than that illustrated in my above mentioned prior application, and also that the invention may be employed for feeding other articles than hooks without departing from the scope of the invention as expressed in the claims. Therefore I do not wish to be limited to all the details of construction shown, but

What I claim is: —

1. In a machine for feeding hooks and the like, the combination of a main supporting frame, a frame movably mounted thereon, feeding devices arranged in inclined position on said movable frame, a handle supported by the main frame for raising and lowering one end of the movable frame to change the angle of inclination thereof, a projection from the movable frame, means movable with said handle and engaging said projection for operating it, and means for fixing the movable frame in adjusted positions.

2. In a device of the class described, the combination of a main supporting frame, a second frame pivoted thereon at one end, hook feeding devices arranged in inclined position on the movable frame, means on the main frame for raising and lowering the opposite end of the movable frame, and a fastening device independent of said means for securing the movable frame in adjusted positions.

3. In a machine for feeding hooks and the like, the combination of a main supporting frame, a frame movably mounted thereon, feeding devices arranged in inclined position on said movable frame, an oscillatable handle supported by the main frame for raising and lowering one end of the movable frame to change the angle of inclination thereof, and means for fixing the movable frame in adjusted positions.

4. In a machine for feeding hooks and the like, the combination of a main supporting frame, a frame movably mounted thereon, feeding devices arranged in inclined position on said movable frame, a rack projecting from the movable frame, and gear teeth engaging said rack for operating it.

5. In a machine of the class described, the combination of a hopper, a plate in the bottom thereof, means for reciprocating said plate in its own plane to positively feed articles along the hopper, a second plate in the hopper to which the articles are fed by said reciprocating plate, and means for vibrating the second plate in a direction transverse to its plane.

6. In a machine of the class described, the combination of an inclined hopper, a reciprocating plate in the bottom thereof for positively feeding articles in the hopper, a second plate to which the articles are fed by said reciprocating plate, and means for vibrating the second plate in a direction transverse to the direction of motion of the first named plate.

7. In a machine of the class described, the combination of an inclined hopper, a reciprocating plate in the bottom thereof for positively feeding articles in the hopper, a second plate to which the articles are fed by said reciprocating plate, and means for simultaneously reciprocating the first plate and vibrating the second plate in a direction transverse to the direction of motion of the first named plate.

8. In a machine of the class described, the combination of an inclined hopper, a reciprocating plate in the bottom thereof for positively feeding articles in the hopper, a second plate to which the articles are fed by said reciprocating plate, and means for vibrating the second plate, said means comprising a vibrating arm having a spring-pressed contact point thereon for engaging said movable plate.

9. In a machine of the class described, the combination of a hopper having a movable inclined plate in the bottom thereof, a feeding wheel against which said plate is held, a spring-pressed plunger under said hopper, and a pivoted member engaged by said plunger and connected with said plate to normally hold it in a certain position, and yielding means for vibrating said plate.

10. In a machine of the class described, the combination of a hopper having a movable inclined plate in the bottom thereof, a feeding wheel against which said plate is held, a spring-pressed plunger under said hopper, and a pivoted member engaged by said plunger and connected with said plate to normally hold it in a certain position.

11. In a machine of the class described, the combination of a hopper having a movable inclined plate in the bottom thereof, a spring-pressed plunger under said hopper, a member engaged by said plunger and adapted to normally hold said plate in a certain position, and means for feeding articles from the hopper, against which said plate is yieldingly held by said plunger.

12. In a machine of the class described, the combination of a hopper having a movable plate therein, a rotary feeding device and resilient means for normally pressing said plate against the feeding device.

13. In a machine of the class described, the combination of a hopper having an inclined bottom, a series of rotary wheels located at the bottom of the hopper for feeding articles therefrom, means for rotating said wheels, and means for stopping any desired one of said wheels without interfering with the others.

14. In a device of the class described, the combination of a hopper or chute, a rotary feeding-out device therefor, consisting of a series of wheels, a main shaft, and independent means connected with the main shaft for operating each of said wheels.

15. In a machine of the class described, the combination of a hopper or chute, a rotary feeding-out device therefor, consisting of a series of wheels, a main driving shaft, independent means connected with said shaft for operating each of said wheels, a series of chutes, one below each wheel, and levers located between said chutes and having connections for connecting and disconnecting the shaft with said wheels.

16. In a device of the class described, the combination of a hopper, a rotary feeding-out device at the bottom thereof, guard plates at any angle to each other located in the hopper and extending up the side of said rotary device, and a belt extending between said guard plates and out of contact with the interior of the hopper for operating said feeding device.

17. In a device of the class described, the combination of a series of chutes having means for arranging hooks or the like in substantial parallelism during their descent therethrough, a series of feeding devices at the upper end of said chutes for delivering articles thereto, and means for individually disconnecting each one of said feeding devices from the source of power without disturbing the others.

18. In a device of the class described, the combination of a main driving shaft, a cam on said shaft, a lever adapted to be operated by said cam, an inclined hopper, a feeding device in the hopper connected with said lever to be operated thereby, guides for receiving articles from said hopper, a cross bar adjacent to said guides, a movable frame on which the cross bar is mounted, and a rod connected with said frame and operated by said driving shaft whereby the descent of the articles will be stopped periodically.

19. In a machine of the class described, the combination of an inclined guide for feeding articles, a cross bar above the guide, a cross bar below the guide, and means for intermittently moving said cross bars toward and from the guide to arrest the descent of the articles therealong and agitate the guide.

20. In a machine of the class described, the combination of an inclined guide for feeding articles, a cross bar above the guide, a cross bar below the guide, a shaft, a rod operated by said shaft and connected with one of said cross bars, and means controlled by said shaft for operating the other cross bar.

21. In a machine of the class described, the combination of an inclined guide for feeding articles, a cross bar above the guide, a cross bar below the guide, and means for intermittently moving said cross bars toward and from the guide to arrest the descent of the articles therealong and agitate the guide, said means comprising a shaft, a rod operated by said shaft and connected with one of said cross bars, and means controlled by said shaft for operating the other cross bar.

22. In a device of the class described, the combination of a pair of guide rods separated from each other and adapted to support and feed articles forward thereon, a cross bar above the rods, a cross bar below the rods, means for operating said cross bars and means whereby the operating means for the upper bars may be thrown out of operative position.

23. In a machine of the class described, the combination of a series of guide rods, a main shaft, a rod operated by the main shaft, means controlled by the rod for stopping the feed of articles on said rods, and means controlled by said rod for rearranging the articles in a different position when they are fed from said guide rods.

24. In a machine for feeding hooks, the combination of two plates in contact, the first plate having two passages therethrough, one being adapted to receive the hooks with their bills in a certain position and pass them through the plate, and the other to receive hooks located in any position and pass them through the plate, the other plate having a passage adapted to register with said passages for passing the hooks through the second plate, means for intermittently moving the first plate to present first one passage and then the other to position for receiving the hooks, and means whereby the second plate is moved by the first plate to cause its passage to register alternately with the passages thereof and to pass the hooks therethrough.

25. In a machine for feeding hooks, the combination of two plates, one superposed upon the other, means for intermittently rotating the upper plate, said upper plate having a passage-way to allow the passage of hooks with their bills presented on one side, another passage-way located opposite the first so shaped as to allow the passage of a hook regardless of the position of the bill, means for oscillating the lower plate, said lower plate having an opening shaped to pass the entire hook therethrough, whereby the position of the hooks which may not fall immediately through the top plate is reversed before passage through the plates.

26. In a machine for feeding hooks, the combination of an oscillatory plate, a second plate mounted to turn on the same axis, the first named plate being superposed above the second, the oscillatory plate having a passage to allow hooks to pass therethrough with their bills located in a certain position, and another passage located on the opposite side of a form to permit the passage of a hook therethrough regardless of the position of the bill thereof, the lower plate having openings shaped to pass the entire hook therethrough, and means for oscillating the upper plate to bring both of its passages alternately into register with the passage of the lower plate, whereby hooks presented in position to pass through the first named passage will be discharged through both plates and those presented in any other position will be reversed and passed through both plates by means of the second passage, but all hooks passed through will emerge from the bottom plate with their bills in the same position.

27. In a machine for feeding hooks, the combination of an oscillatory plate, a second plate mounted to turn on the same axis and having means whereby the oscillation of the first plate will intermittently rotate the second plate, and means for permitting the discharge of hooks therethrough.

28. In a machine for feeding hooks, the combination of an oscillatory plate having a passage therethrough capable of receiving the bill of a hook, a plate mounted to turn on the same axis having passages therethrough for the hooks, and means connected with the oscillatory plate for intermittently rotating the second plate into a position in which hooks deposited thereon may be discharged therethrough and presented in one position and into another position in which they will be carried around to the passage in the oscillatory plate and then fed therethrough.

29. In a machine for feeding hooks, the combination of an oscillatory plate having a passage therethrough on one edge for receiving the bills of the hooks, a second plate mounted to turn on the same axis and having passages for permitting entire hooks to be fed therethrough movable into a position to register with the first named passage, said first named plate having means for preventing the hooks being fed into said passages in the second plate when fed thereto with their bills forward.

30. In a machine for feeding hooks, the combination of a movable plate having a passage therethrough on one edge for receiving the bills of the hooks, a second plate mounted to turn and having passages for permitting entire hooks to be fed therethrough movable into a position to register with the first named passage, said first named plate having means for preventing the hooks being fed into said passages in the second plate when fed thereto with their bills forward.

31. In a machine for feeding hooks, the combination of an oscillatory drum, a plate fixed thereto and having a passage on one side thereof for the bills of the hooks, and having means for preventing the descent of a hook when presented with its bill forward and for allowing the descent of a hook presented with its bill on the opposite side, a second plate mounted to turn on the same axis and having passages for permitting the hooks to drop therethrough, and yielding means connected with said drum for intermittently rotating the second plate so that it moves with the oscillatory plate during the motion of the latter in one direction and not in the other.

32. In a hook feeding machine, the combination of a plate having passages for receiving and feeding hooks, a second plate above the first having means for preventing the passage of hooks through the first plate when presented with their bills forward, and means whereby such hooks will be moved along by the first named plate and reversed, said second plate having means for allowing them to drop when they are completely reversed, whereby all the hooks will be discharged with their bills in the same direction.

33. In a machine for feeding hooks, the combination of an oscillatory drum, a reciprocating shaft having means for oscillating the drum, a plate fixed to the drum, a second plate adapted to receive hooks, yielding means for driving the second plate from the drum, a sliding rod and means connected with said sliding rod for controlling the operation of the second plate.

34. In a machine for feeding hooks, the combination of a plate having a plurality of radial passages for permitting the hooks to descend therethrough, means for operating said plate, means for preventing hooks presented in a certain direction from being fed through the plate, means for turning said hooks around into reverse position, whereby they may be fed through the plate, and means for periodically preventing the operation of said plate.

35. In a machine for feeding hooks, the combination of a plate having a plurality of radial passages for permitting the hooks to descend therethrough, means for operating said plate, means for preventing hooks presented in a certain direction from being fed through the plate, means for turning said hooks around into reverse position, whereby they may be fed through the plate, means for periodically preventing the operation of said plate, and adjustable spring-pressed means for normally holding the preventing means in inoperative position.

36. In a machine for feeding hooks, the combination of a plate having a plurality of passages for permitting the hooks to descend therethrough, means for operating said plate, means for preventing hooks presented in a certain direction from being fed through the plate, means for periodically preventing the operation of said plate, and adjustable spring-pressed means for normally holding the preventing means in inoperative position.

37. In a machine for feeding hooks, the combination of a plurality of hook feeding devices, reciprocating slides, adjustable nuts mounted on each of said slides, a plate connected with each of said devices and adapted to engage between the nuts on all the slides for operating all of said feeding devices, and means for vibrating said plate.

38. In a machine for feeding hooks, the combination of a plurality of hook feeding devices, a plurality of means for operating said devices, a vibrating plate adapted to engage each of said means for operating all of said feeding devices, yielding means connected with each of said means for operating the feeding devices, and positive means for preventing any desired one of the feeding devices from operating.

39. In a machine for feeding articles, the combination of an oscillatory shaft, a pair of brackets thereon, yielding means for transmitting motion of the shaft to the brackets, and feeding means connected with said brackets.

40. In a machine of the class described, the combination of a shaft, means for turning said shaft, said shaft having a groove therein, a bracket mounted to turn on said shaft and having a spring-pressed plunger adapted to enter said groove, the contacting surfaces of the plunger and groove being rounded, and means connected with said bracket for operating a plurality of feeding devices.

41. In a machine of the class described, the combination of a shaft, a series of feeding devices, and means yieldingly held in contact with the shaft and capable of being disconnected therefrom by the application of an excessive force, for operating said feeding devices.

42. In a machine of the class described, the combination of an inclined guide, having means for supporting hooks by their shoulders with their bills hanging down, and a guard plate above, and parallel with, the guide, and having a lower edge adapted to enter the space between the shoulders of the hooks.

43. In a machine for feeding hooks, the combination of a hook guide or chute, an inclined guide for receiving the hooks therefrom, brackets on the inclined guide, a rod reciprocably mounted on each bracket, a spring for holding the rod down, means for adjusting the height of the rod and tension of the spring, and a guide plate removably carried by said rods and extending to the guide or chute, for preventing the dislodgment of the hooks from the inclined guide.

In testimony whereof I have hereunto set my hand, in the presence of two subscribing witnesses.

WALTER L. CURTIS.

Witnesses:
ALBERT E. FAY,
C. FORREST WESSON.